Figure 10:
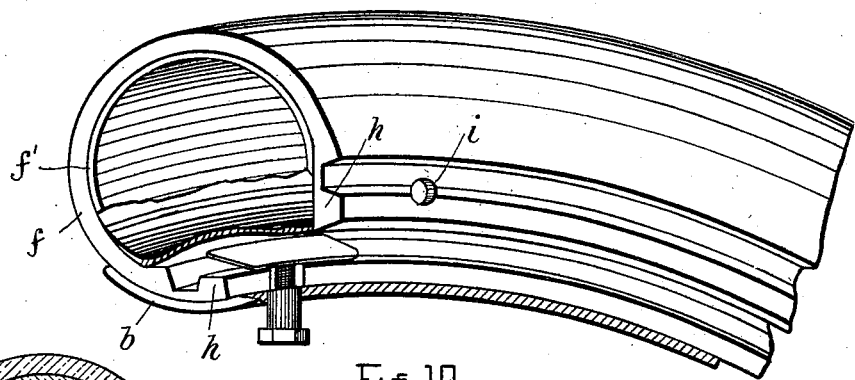

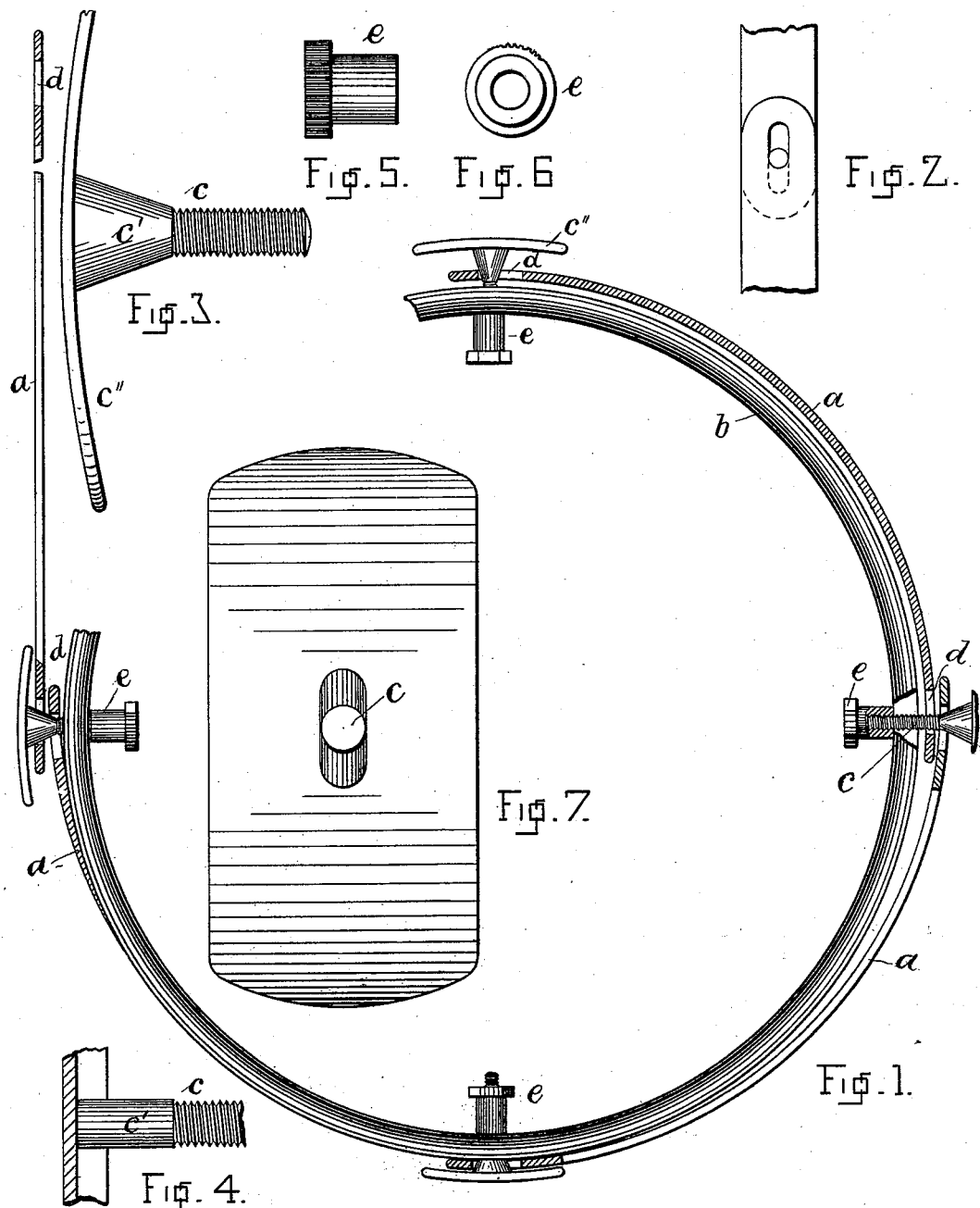

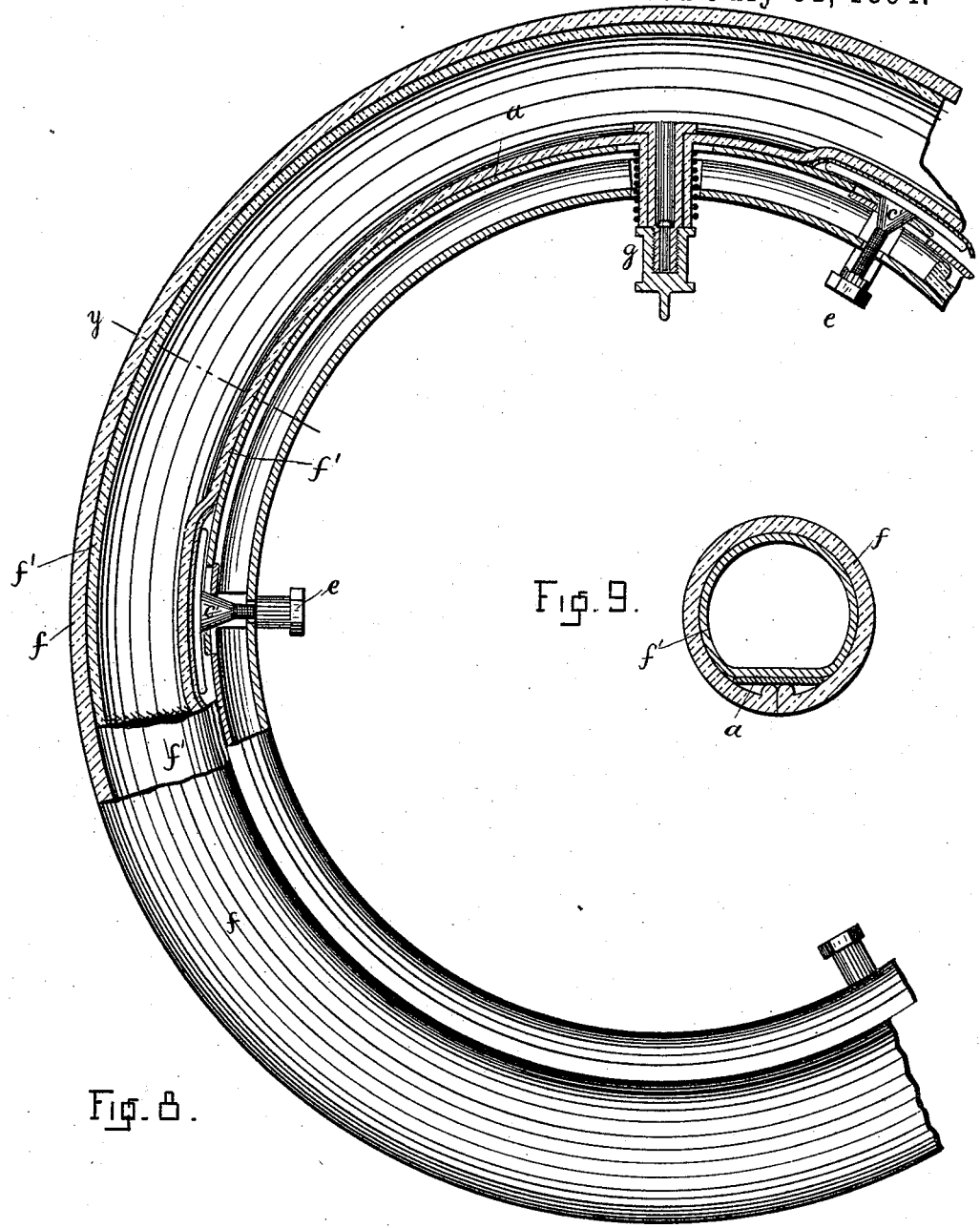

(No Model.) 5 Sheets—Sheet 3.

G. H. CHINNOCK.
BICYCLE WHEEL.

No. 523,831. Patented July 31, 1894.

WITNESSES:
T. L. A. Pfaff.
Sadie Garton.

INVENTOR
George H. Chinnock
BY HIS ATTORNEY.
Edward P. Thompson

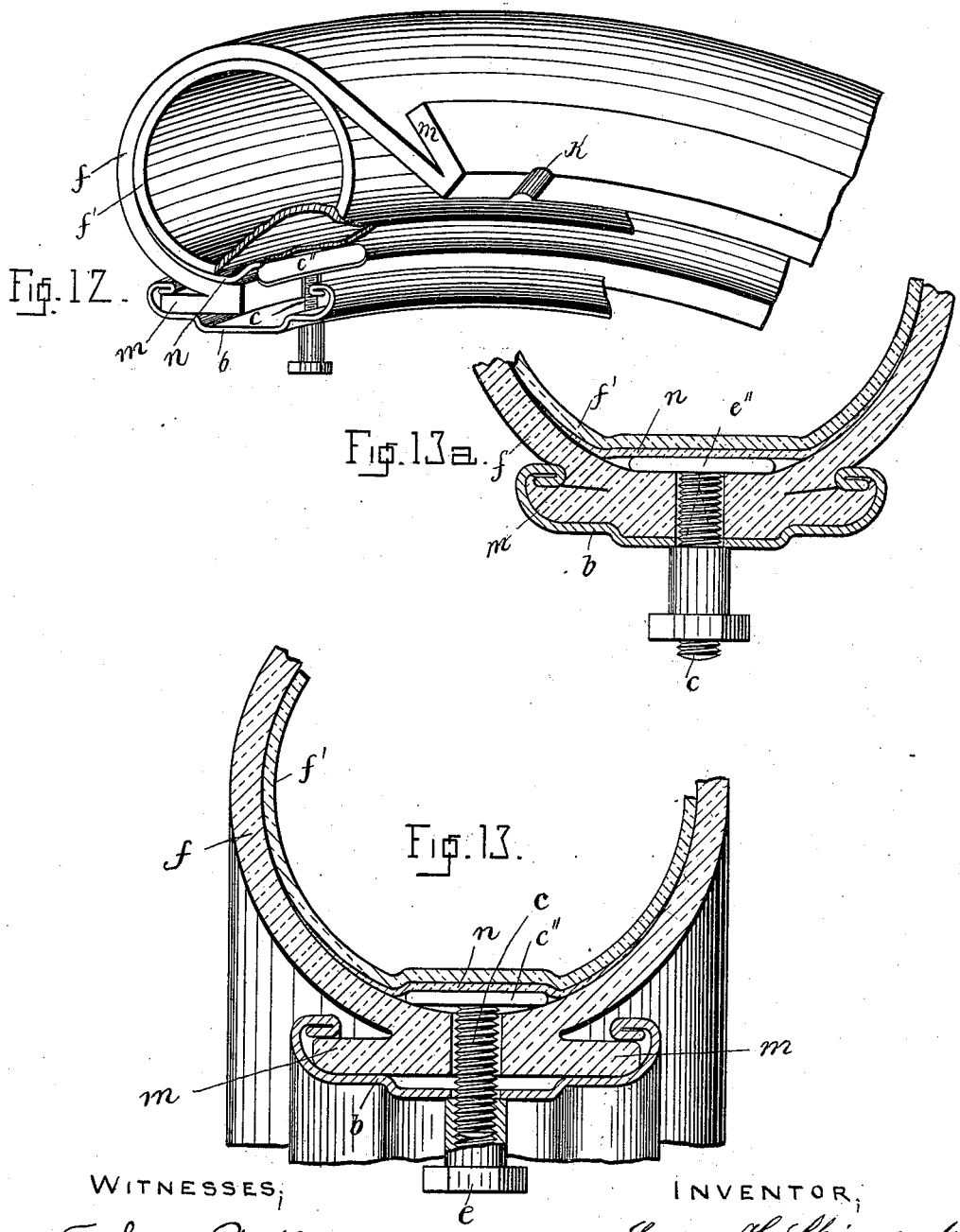

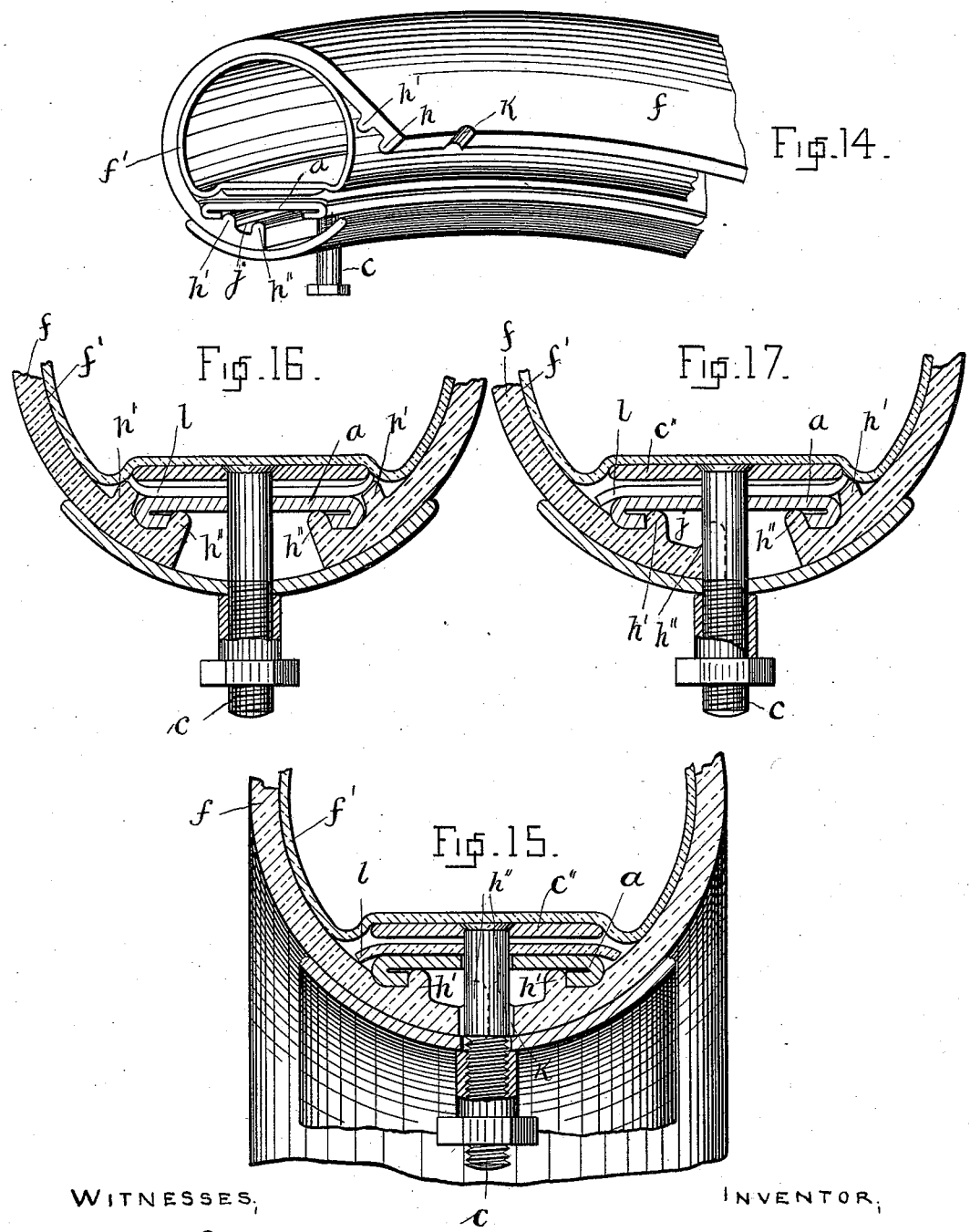

UNITED STATES PATENT OFFICE.

GEORGE H. CHINNOCK, OF NEW YORK, N. Y.

BICYCLE-WHEEL.

SPECIFICATION forming part of Letters Patent No. 523,831, dated July 31, 1894.

Application filed March 31, 1894. Serial No. 505,872. (No model.)

*To all whom it may concern:*

Be it known that I, GEORGE H. CHINNOCK, a citizen of the United States of America, and a resident of New York, in the county and State of New York, have invented certain new and useful Improvements in Bicycle-Wheels, of which the following is a specification.

My invention relates to means and details thereof, for applying and retaining inflated tires upon the rims of wheels, especially of the usual bicycle type.

The characteristics of the device embodying my invention are fully set forth in the drawings, and the claims set forth what I believe to be novel and useful.

Preliminarily to the detail description and claims, I may state some of the leading features of the device in a general manner. As usual, there is an inner tube for holding compressed air and a stout canvas and slotted rubber cover to protect the inner tubes. The general object is to hold the cover over the tube to the rim of the wheel. I provide what may be termed a sectional band, the ends overlapping, and a wedge shaped bolt passing through the overlapped portions. The holes are long, so that when the bolt is tightened, the sections are drawn together. The pull on each section is at both ends from the center. The edges of the rubber cover are compressed between the sectional band and the rim and the slack of the cover may be taken up if the cover is too large or the inner tube too small, so that tubes and covers of variable sizes may be employed. When the inflated tire collapses, no injury is done to the rider, because the tire does not fall off from the rim.

Figure 11:
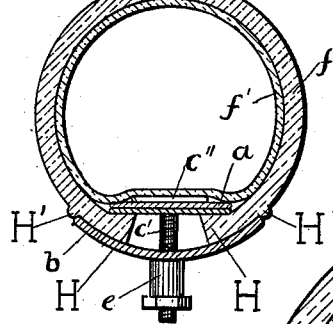
Figure 11B:
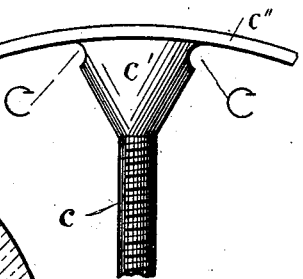
Figure 11A:
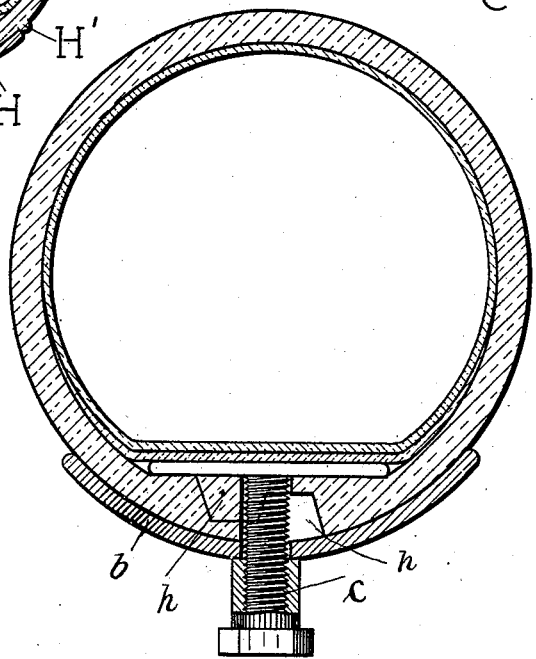

Figure 1, is a sectional rim in part, and also a side elevation of the device in so far as my invention is concerned. Part of the rim is broken away, and different parts of the device are in different phases, so as to show in one view how the device operates. Fig. 2, shows overlapping ends of certain bands which are used in the construction. They are overlapped to such an extent as to allow passage of the fastening bolt. Fig. 3, is a side elevation of the binding bolts on a much enlarged scale. Fig. 4, is a different view of the bolt. Figs. 5, and 6 are different views of the nut used on the bolt. Fig. 7, is a view of the bolt as viewed from the right hand in Fig. 3. Fig. 8, is a sectional view, partly in elevation, of that device which is shown in Fig. 1, the inflated tire and its cover. Fig. 9, is a section of the wheel tire at $y$, in Fig. 8. The bolts are shown tightened so that the tire is ready for use. Figs. 10 and 11 are perspective and cross-sectional views of a complete tire modified as hereinafter described. Figs. 11$^a$ and 11$^b$ are modifications of the clamps. Figs. 12 and 13 are similar views of another modification. Fig. 13$^a$, shows a different phase of that shown in Fig. 13. Figs. 14, and 15 are similar views of still another modification. The perspective views in each instance show the cover partly removed. The views that are perspective show cross-sections. In Figs. 13 and 15 parts of the tire are broken away. Figs. 16 and 17 show the same as Fig. 15, in different phases.

The device embodying my invention consists of the combination of a sectional band, having sections $a$, circumscribing the rim $b$, of the wheel, bolts $c$, having wedge shaped shanks $c'$, passing through slots $d$, provided in the ends of said sections, whose ends overlap each other, and nuts $e$, for retaining the bolts $c$, to the rim $b$, through which they pass. The slots in the bands $a$, extend lengthwise, and are so located that when the ends of the bands over-lap each other, the wedge shaped shanks are located in the slots. The bolts $c$, have large flat heads $c''$, which press upon the bands, when the nuts are tightened.

Referring particularly to Fig. 1, it may be stated that some of the nuts are loose and others tight, so as to show their various dispositions. In Fig. 8, all the nuts are tightened.

The cover is lettered $a$. It is held to the rim by the pressure of the bolts $c$, upon the bands $a$, the edges of the cover being between the bands and rim.

It should be noticed that the slack of the cover may be taken up by loosening the bands, and drawing the edges of the cover closer together, and then again tightening the bands. After this is accomplished, the inner tube may be inflated by forcing air through the usual valve $g$.

If by any accident, the inner tube should collapse, the rider will receive no injury, because the rubber tire will be retained upon the rim $b$, by my clamping devices.

When the rubber tire wears out, it may be replaced by another, but not necessarily of the same size as to the diameter from the rim $b$, outward, because the slack can be taken up as described. Further these bands and bolts may be applied to any type of bicycle, or wheels having a rim $b$, as all that is necessary is to make holes in the rim, for the passage of the bolts $c$. The heads $c''$, of the bolts $c$, are preferably, rather large so that they may hold the bands effectually. The reasons why the wedges $c'$, are provided is that as the bolts are drawn inwardly by the nuts $e$, the bands are pulled upon from opposite ends, until they are pressed upon the rim of the wheel, and against the edges of the cover as above set forth. The nuts $e$, may have milled heads as in Fig. 5, or octagonal heads as in Fig. 1. The shanks $c'$, are purposely not wedge shaped relatively to the sides of the rim $b$, but only in the direction of the full length of the bands $a$, because the bands are to be drawn together, in the direction of the circumference of the wheel. When any band is released at one end, it straightens outward as shown at the left of Fig. 1. This is because they are, in practice, made of a straight strip of tempered steel. In order to apply a cover in the first instance, the bands $a$, are placed upon the rim, and the bolts $c$, passed through them and the rim $b$, and the nuts $e$, are placed loosely thereon, so that the bands $a$, stand out from the rim $b$, to their maximum extent, as shown approximately at the upper right hand side of Fig. 1. Now the cover $f$, and tube $f'$, are taken, and the lateral edges placed under the bands $a$, at the opposite sides thereof, and forced toward the central line of the rim, until the inner diameter of the cover $f$, is about equal to the full diameter of the tube $f'$, which may be inflated after the clamps are tightened.

My invention is capable of modification. See for example in Figs. 10 and 11. Where the bands are omitted, and only the bolts are employed, which need not have the wedge shaped shanks $c'$.

Another modification shown consists in molding projections $h$, so that the edges may be dovetailed, and prevented from pulling apart when the bolts are accidentally loosened. These projections $h$, which fit in corresponding grooves take the place of the bands in holding the edges effectually together and around the tube $f'$, at points between the bolts $c$, which pass through holes $i$, located in the cover, at the proper position. These holes serve a very useful purpose for the cover $f$, preventing it from creeping around the rim $b$, which is well known to be objectionable. In practice, I usually employ eight bolts to a tire, when the bands are omitted.

In Figs. 14, 15, and 17 is shown a further modification, whereby projections on the rubber cover are provided in such manner that the cover can be adjusted to differently sized inflatable tubes. The projections are lettered $h'$ and $h''$ being parallel and extending around the length of the cover $b$. The projections $h''$ are at the extreme edges, and those lettered $h'$ are away from the edge, so as to leave a groove $j$, between them. The bands are preferably employed in this instance, as shown at $a$, the side edges of which are overlapped upon themselves to form thickened edges, which lie beyond the projections $h'$, in Fig. 15, whereby the cover is drawn up to its smallest size. The cover can be let out to a larger size as shown in Fig. 17, where one thickened edge lies beyond both projections, and where the other lies in one of the grooves.

In Fig. 16, the cover has its fullest capacity by allowing the edges of the bands to lie in the respective grooves $j$. Notches $k$, are cut into the edges of the cover $b$, at the bolts so that creeping of the cover, may be overcome. Washers $l$, of some soft material such as canvas rubber, are provided between the bolt heads $c''$. These may extend all, or partly around the rim. They serve to protect the inflated tube $t'$, from being cut by the band $a$, which would otherwise wear against it with injurious effects.

In Figs. 12, 13, and 13$^a$, the rim $b$, has inwardly turned edges, and the cover $f$, has flanges fitting therein. As before, there are notches $k$, in the cover at the bolts $c$. The heads $c''$, bear directly upon the cover, and between it and the inflated tube $f'$, is a flap $n$, one edge of which is fastened to the cover. This flap protects the inflated tube from wearing against the bolt heads $c''$. The rim $b$, by its overturned edges may be said to be provided with lateral grooves for the reception of the flanges $m$. As the cover $f$, is held all around by the rim, the bands are unnecessary in this instance.

In Fig. 11$^a$, the cover is provided with enlarged edges H, which are located between the band and the rim, and heads H', extend around the cover to prevent the edges from being pushed too far under the band.

In Fig. 11$^b$, a groover C, is provided on the bolt so as to lock the band better to the bolt.

I claim as my invention—

1. The combination with the rim of a wheel, of a spring band divided into segments which are joined end to end with overlapping portions, an inflatable tube located around the segments, a cover over the tube having its edges located between the segments and the rim, and means for putting the segments under tension.

2. The combination with the rim of a wheel, of a spring band divided into segments which extend around said rim, and means for putting the segments under tension.

3. The combination with the rim of a wheel, of a spring band divided into segments, which are joined end to end, with overlapping portions, an inflatable tube located on the segments, a slotted cover over the tube and having its edges located between the segments and the rim, and means for putting the segments under tension, said means consisting of wedge shaped bolts, which press against the edges of holes provided in the overlapped portions of said segments.

4. The combination with the rim of a wheel, of an inflatable tube circumscribing the same, a cover therefor, a band divided into segments which are joined end to end, with overlapping portions, which contain longitudinal holes, bolts passing through said holes, and having one pair of opposite sides parallel to each other, the other pair being tapered toward each other, and pressing against the edges of the holes in the direction of the length of the segments and nuts upon the bolts on the side of the rim opposite the said segments.

5. The combination with the rim of a wheel, of a spring band divided into segments which are joined end to end, with overlapping portions, an inflatable tube located around the segments, a slotted cover surrounding the tube, and having notches in the edges thereof, bolts, having tapered portions, which pass through the segments and the rim, and located at and in said notches, and having grooves in which the edges of the segments are sprung.

6. The combination, with the rim of a wheel, of a slotted cover, containing an inflatable tube, a pair of parallel beads, extending along each edge of the cover, a band having thickened edges which are located against said beads, and means for clamping said band to said rim.

In testimony that I claim the foregoing as my invention I have signed my name, in presence of two witnesses, this 27th day of March, 1894.

GEORGE H. CHINNOCK.

Witnesses:
ROBT. C. TAYLOR,
EDWARD P. THOMPSON.